Nov. 17, 1964     G. C. PEARCE ETAL     3,157,175
DOMESTIC COOKING APPLIANCE
Filed March 31, 1960     10 Sheets-Sheet 1

INVENTORS
GEORGE C. PEARCE
JESSE L. EVANS
MILLARD E. FRY
FRANK L. MILBURN
BY
Frederick M. Ritchie
THEIR ATTORNEY INVENTORS
GEORGE C. PEARCE
JESSE L. EVANS
MILLARD E. FRY
FRANK L. MILBURN
BY
Frederick M. Ritchie
THEIR ATTORNEY Nov. 17, 1964   G. C. PEARCE ETAL   3,157,175
DOMESTIC COOKING APPLIANCE
Filed March 31, 1960   10 Sheets-Sheet 5

INVENTORS
GEORGE C. PEARCE
JESSE L. EVANS
MILLARD E. FRY
FRANK L. MILBURN
BY
Frederick M. Ritchie
THEIR ATTORNEY

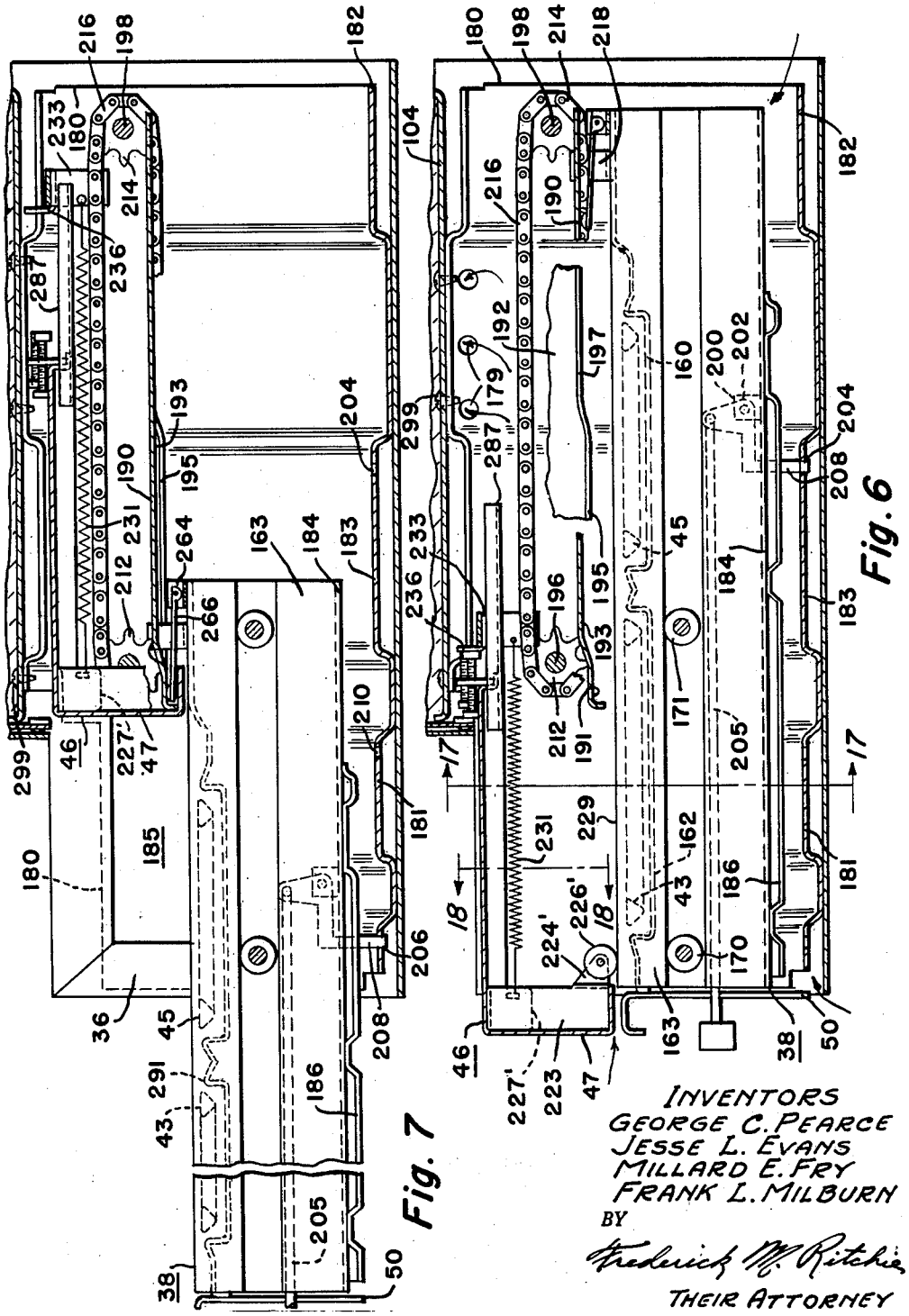

Nov. 17, 1964    G. C. PEARCE ETAL    3,157,175
DOMESTIC COOKING APPLIANCE
Filed March 31, 1960    10 Sheets-Sheet 7
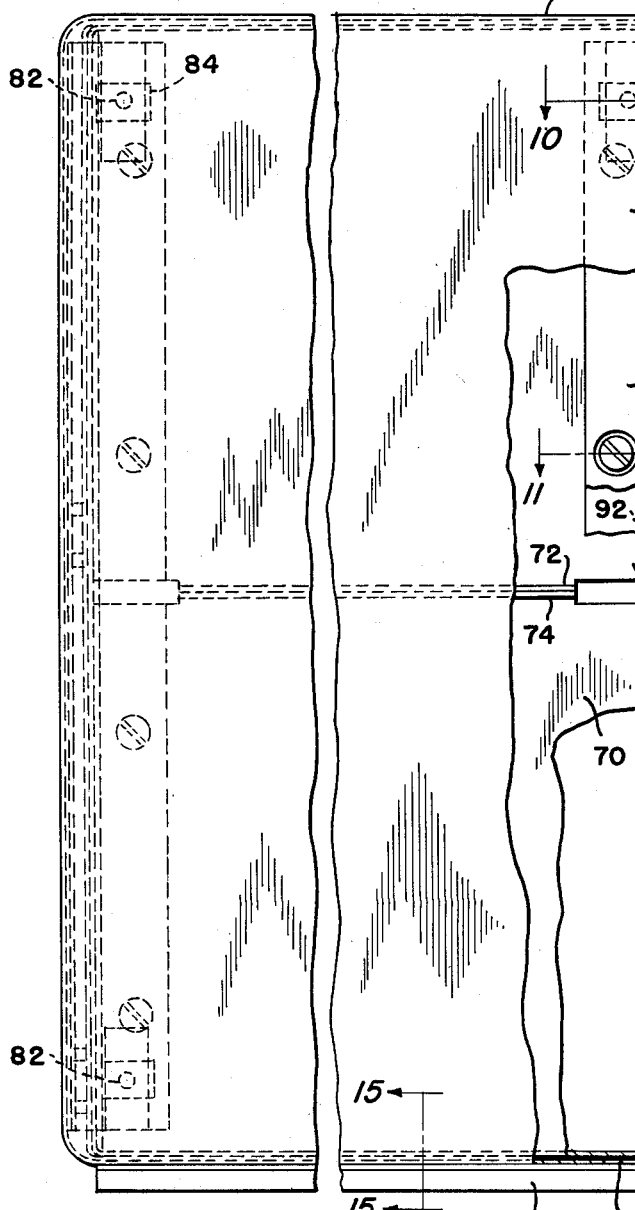
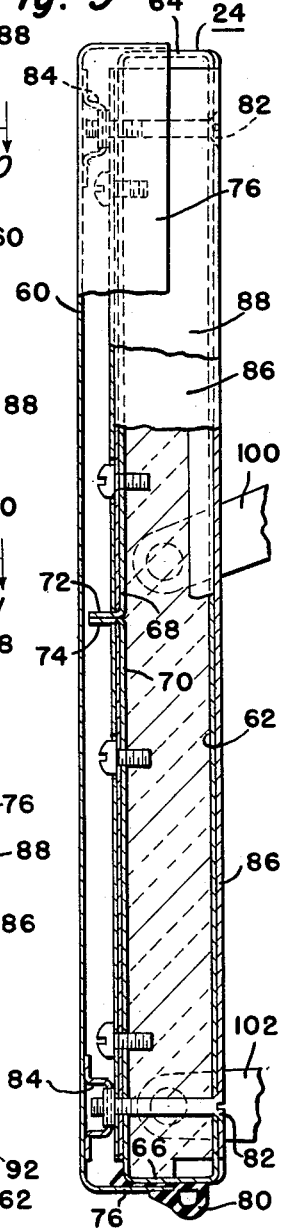
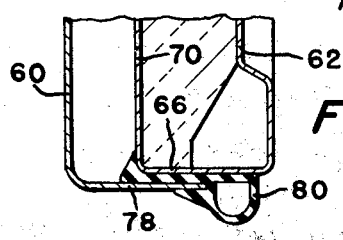
INVENTORS
GEORGE C. PEARCE
JESSE L. EVANS
MILLARD E. FRY
FRANK L. MILBURN
BY
Frederick M. Ritchie
THEIR ATTORNEY INVENTORS
GEORGE C. PEARCE
JESSE L. EVANS
MILLARD E. FRY
FRANK L. MILBURN
BY
Frederick M. Ritchie
THEIR ATTORNEY

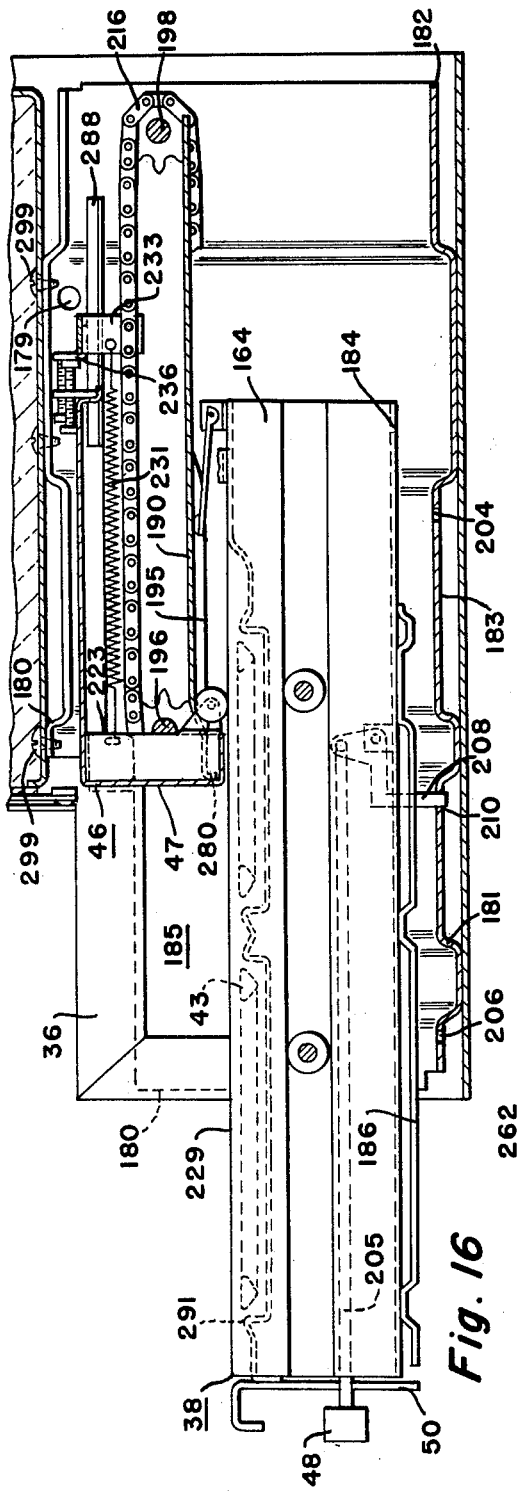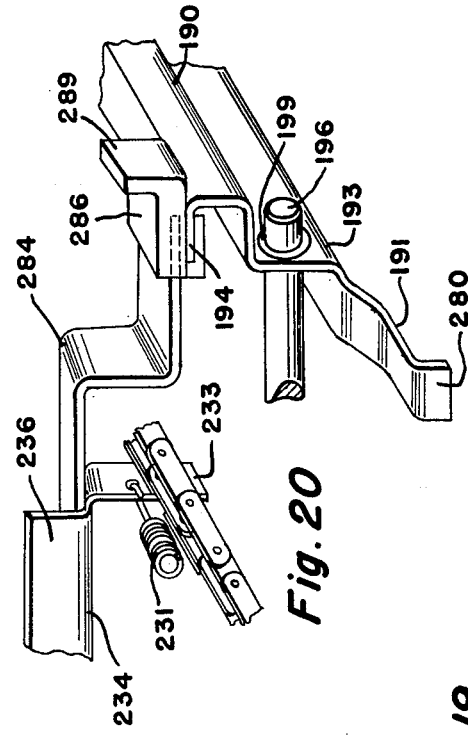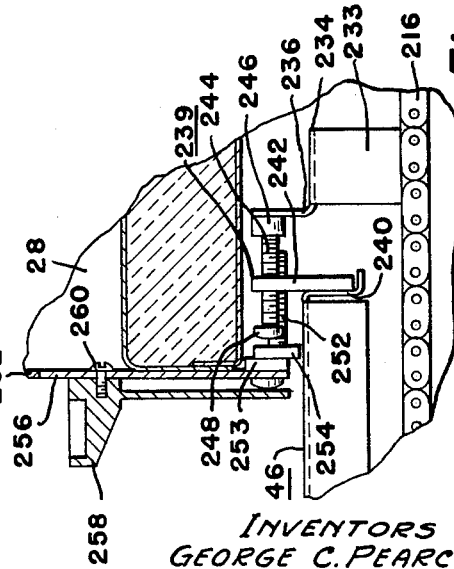

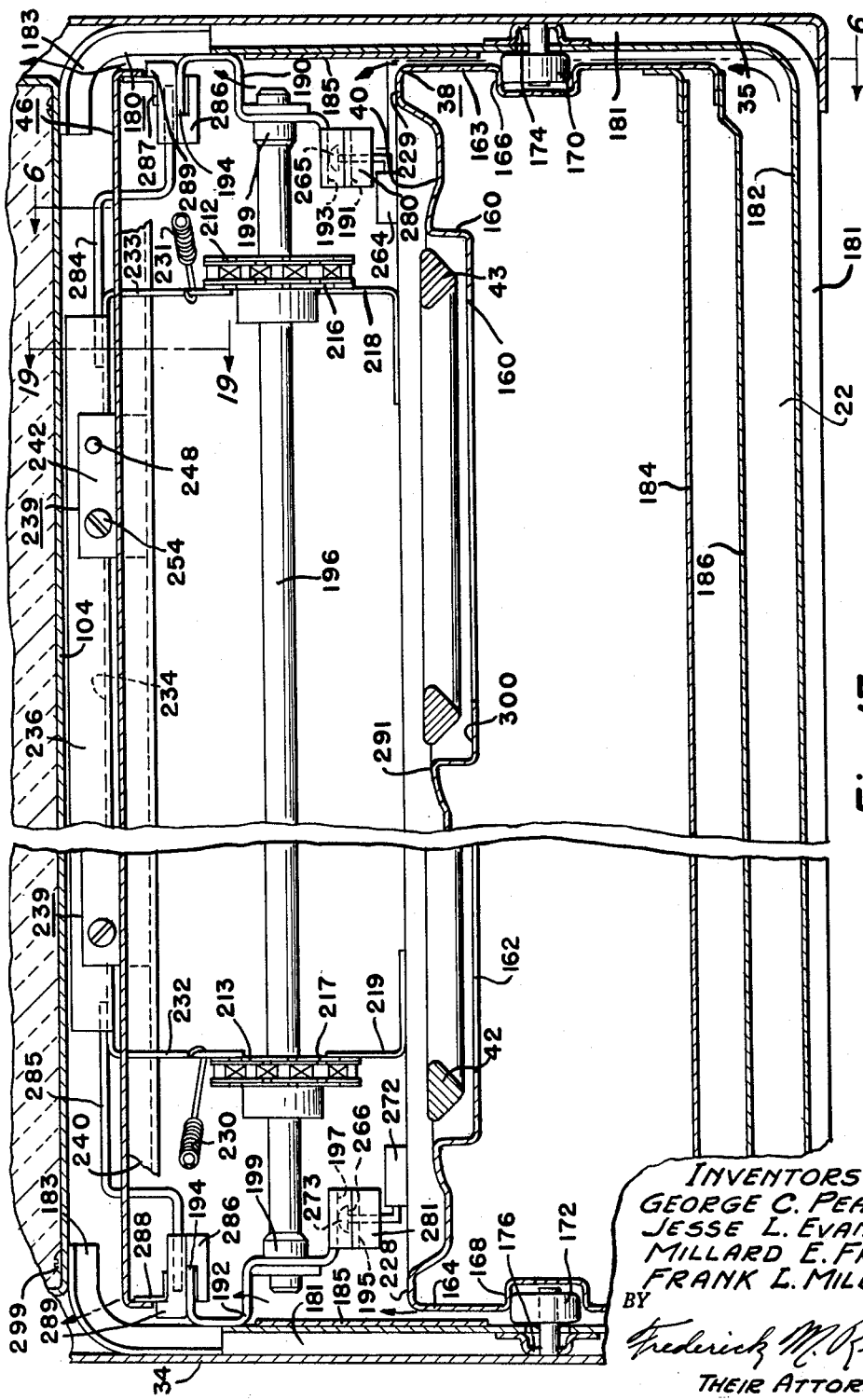

United States Patent Office 3,157,175
Patented Nov. 17, 1964

3,157,175
DOMESTIC COOKING APPLIANCE
George C. Pearce, Dayton, Jesse L. Evans, Tipp City, Millard E. Fry, Dayton, and Frank L. Milburn, Bellbrook, Ohio, assignors to General Motors Corporation, Detroit, Mich., a corporation of Delaware
Filed Mar. 31, 1960, Ser. No. 19,081
18 Claims. (Cl. 126—37)

This invention relates to a domestic appliance and more particularly to an improved free-standing counter-top cooking range having a built-in appearance.

The trend toward built-in applances has caused much of the range industry to divide the integral free-standing range into its components and to market these components separately. This trend has separated the cooking top from the oven. But it is well known that manufacturing and installation economies can be effected by combining the various cooking operations into a single unit. Therefore it is to the incorporation of built-in features in an integral free-standing range that the present invention is directed.

Accordingly, it is an object of this invention to provide a thirty-inch built-in countertop range having an oven disposed above a slidably removable burner or cooking top drawer.

It is also an object of this invention to provide an oven of the above type with a vertically liftable door having a compact counterbalancing system.

Another object of this invention is the provision of a slidably removable burner drawer in a built-in countertop range which has a plurality of operating positions including full out and half out and wherein the energization of the burners carried by the drawer is selectively controlled in response to the positioning of the burner drawer.

It is a further advantage of this invention to provide the burner drawer with slidably removable drip trays beneath the burners or cooking units.

It is also an object of this invention to provide a slidably removable burner drawer with a cover for concealing the burners when the drawer is in its stored position and for providing a back splash for the cooking operations when the drawer is in its half out or full out operating position.

A further object of this invention is the provision of adjusting means for the burner cover which includes a lost motion connection for facilitating movement of the cover to either of two positions while the burner drawer is being moved to one of three positions.

Another object of this invention is to provide ventilation means for the control compartment above the oven.

This invention also contemplates a novel oven door construction comprised of a one piece rear panel wrapper having an integral inner door reinforcement section, an outer panel overlying this reinforcement section to complete the door.

A further object of this invention is to provision of a flush mounted trim ring having a bayonet connection for facilitating removal of the ring without moving the cooking unit or burner.

It is also an object of this invention to provide means for collecting condensation beneath the oven door.

Further objects and advantages of the present invention will be apparent from the following description, reference being had to the accompanying drawings wherein preferred embodiments of the present invention are clearly shown.

In the drawings:

FIGURE 6 is a fragmentary sectional view taken substantially along line 6—6 in FIGURE 17 and showing the burner drawer in its stored position;

FIGURE 7 is a fragmentary sectional view taken substantially along line 6—6 in FIGURE 17 and showing the burner drawer in its fully out position;

FIGURE 8 is a front elevational view of the oven door with parts broken away;

FIGURE 9 is a side elevational view of the oven door with parts broken away;

FIGURE 15 is a fragmentary sectional view taken along line 15—15 in FIGURE 8 showing the bottom door seal;

FIGURE 16 is a fragmentary sectional view taken substantially along line 6—6 in FIGURE 17 and showing the burner drawer in its half out position;

FIGURE 17 is a fragmentary sectional view taken along line 17—17 in FIGURE 6;

FIGURE 19 is an enlarged fragmentary sectional view taken along line 19—19 in FIGURE 17; and FIGURE 20 is a fragmentary perspective view of the burner cover actuator bar and guide rail.

Figure 1:
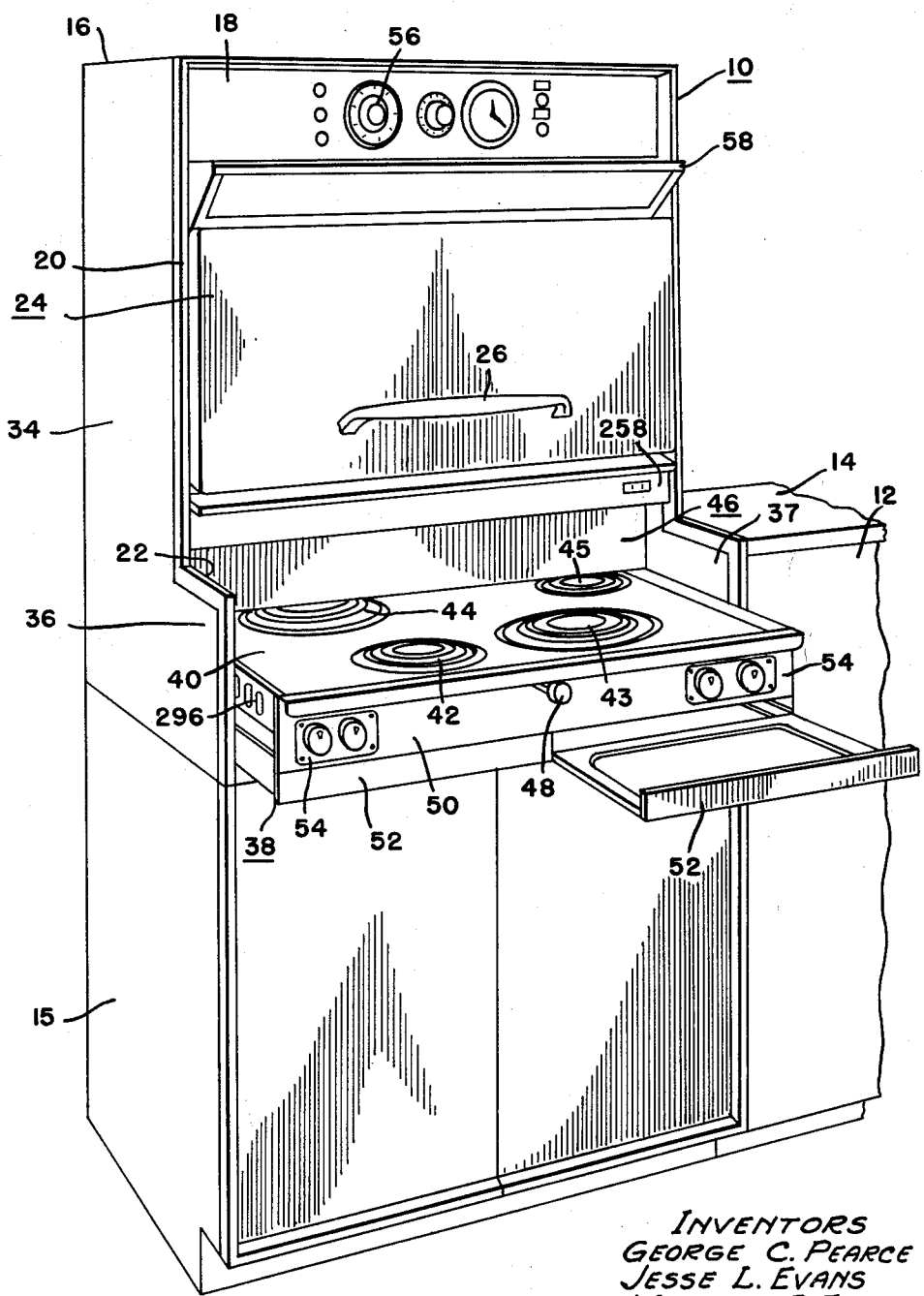
FIGURE 1 is a perspective view of the built-in range of this invention showing the burner drawer in its partially removed or half-out position.

In accordance with this invention and with reference to FIGURE 1, an integral countertop range 10 is shown. The range 10 is adapted to be built-in to a line of base cabinets 12 having a countertop 14 which abuts tight against the range and to set on a matching base cabinet 15 which may be used for storing cooking utensils. If desired, the range may be fastened to and supported by a building wall at the proper height. Generally, the range 10 includes a casing 16 having sidewalls 34, 35 defining a controls section or compartment 18, an oven liner compartment 20 and a burner section or cooking unit compartment 22. The front of the oven compartment is closed by an oven door assembly 24 having a handle 26 which aids the user in lifting the door to its fully open position (shown in FIGURE 2) to expose an oven 28. A plurality of slidably removable oven shelves 30 are disposed within the oven 28 and carried on a removable shelf guide rack 32. Thus, the interior of the oven 28 is substantially unencumbered by any protuberances which might impede the cleaning process. With the door 24 in its raised position it should be apparent that the interior of the oven is completely and easily accessible for cleaning.

The oven 28 is generally not as deep from front to back as are the ovens in conventional floor mounted free-standing ranges. For this reason the spit of an automatic rotisserie (not shown) may be placed diagonally horizontally within the oven 28. One end of the spit may have affixed thereto an angular or bevel gear which is driven by a bevel driving gear extending through a wall in one of the rear corners of the oven. The rotisserie motor may be disposed above in the control compartment 18 and connected with the driving gear by means of a roller chain to the rear of the oven liner. The rotisserie construction described is not shown as it is believed well within the skill of the art to embody these teachings into an oven of the type taught in this invention.

The cooking unit or burner compartment 22 is defined by sidewalls 34 and 35 of the casing 16 which include frontwardly extending cheek plate portions 36, 37 to form the frontward limits of the burner or cooking unit compartment 22. Within the compartment 22 a burner drawer shown generally at 38 is disposed having a slightly recessed top surface 40 on which a pair of front burners 42, 43 and a pair of rear burners 44, 45 are disposed. A cover shown generally at 46 and having a vertical front wall 47 is movably interconnected with the burner drawer 38 such that the burners or cooking units 42, 43, 44 and 45 are concealed when the drawer 38 is slidably positioned completely within the cooking unit compartment 22. A latch means described more fully hereinafter includes an actuating knob 48 on the front wall 50 of the burner drawer 38 which may be actuated to remove a detent so that the drawer 38 may be moved to its half out position shown in FIGURES 1 and 16, its fully out position shown in FIGURES 2 and 7, and its fully in or stored position shown in FIGURE 6. It should be noted that the latch arrangement of this invention positively locks the drawer in each of its positions so that the drawer cannot be inadvertently moved while in operation.

Drip trays 52 may be slidably positioned in the bottom of the burner drawer 38 such that drippings which spill through the cooking unit openings will fall on the drip trays. The drip trays are easily removable for cleaning.

The controls for the surface cooking units 42, 43, 44 and 45 are shown at 54 but it should be recognized that the controls 54 may be positioned on the top surface 40 of the burner drawer 38 or on a front panel 122 of the controls compartment, such as the control knob 56 for the oven heating element 57. For convenience and utility a lamp housing 58 (FIGURE 4) is disposed between the controls compartment 18 and the oven compartment 20, the lamp 59 therein shedding light through upper and lower transparent panels both on the control panel and the burner drawer 38.

The construction of the oven door 24 will now be explained with reference to FIGURES 8, 9, 10, 11 and 15. Best seen in FIGURE 9, the door 24 is comprised of a front or outer door panel member 60 and a rear or inner door panel member 62. Note that the rear panel 62 is formed in a folded boxlike shape with forwardly extending top and bottom walls 64 and 66 respectively which are again folded to terminate in internal reinforcing wall portions 68 and 70. The ends of the reinforcing portions 68 and 70 are shown as outwardly turned terminal flanges 72 and 74 which lie in juxtaposition to each other and are connected in any suitable fashion, such as by pinch welding. Thus, an integral reinforcing boxlike structure forms both the inner door panel 62 and the internal reinforcement for the door 24. The front or outer door panel 60 is drawn into a shallow open-top box-like shape having a peripheral edge flange 76 for receiving the inner door panel 62 in nested relationship. The bottom flange portion 78 of the peripheral edge flange 76 cooperates with the bottom wall 66 of the inner door panel 62 to retain a door mounted oven seal 80 (FIGURE 15).

Figure 10:
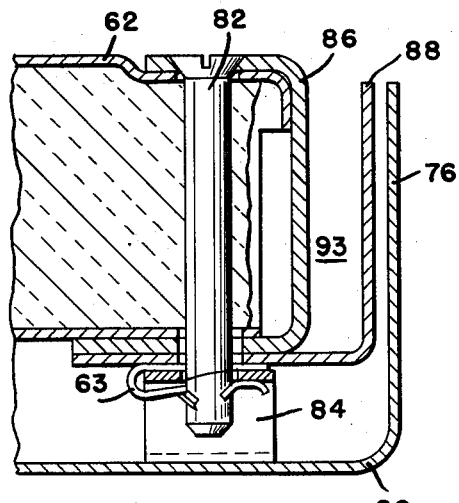
FIGURE 10 is a sectional view taken along line 10—10 in FIGURE 8.
Figure 11:
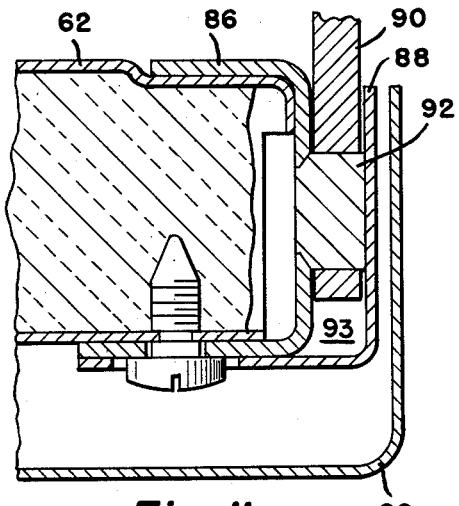
FIGURE 11 is a sectional view taken along line 11—11 in FIGURE 8.

As best seen in FIGURE 10, the front door panel 60 is assembled to the rear door panel 62 by means of four bolts 82 which extend into engagement with U-shaped brackets 84 fastened as by welding to the inner side of the front door panel 60. The bolts 82 extend through a U-shaped door support channel 86 interlocked or telescopingly engaged with each side of the inner door panel 62 and connect with a sheet metal fastener 63 to lock the inner door panel 62 and the outer door panel 60 in assembled relationship. An L-shaped control arm retainer 88 is also included in the assembly and serves to retain an upper control arm 90 and lower control arm 94 pivotally connected to the right-hand side of the door 24. Each control arm such as 90 is relatively pivotally positioned on a bushing such as 92 which is securely fastened as by welding to the door support channel 86. Note that the outer flange of the retainer 88 is spaced from the support channel 86 to form a cavity 93 to receive the upper control arm 90 and the lower control arm 94 when the door 24 is in its closed position. In order to preclude any rubbing or scraping noise the control arms may be coated with an elastomeric product such as nylon. By concealing the support arrangement when the door is closed, the overall appearance of the product is enhanced. It should of course be recognized that the support arrangement is identical for both sides of the oven door 24. The foregoing explanation for the right-hand side of the door will suffice for the support arrangement on the left-hand side. Note also that the oven of this invention could be provided with a glass or transparent panel door of the type taught in our copending application S. N. 19,082 filed March 31, 1960.

Figure 2:
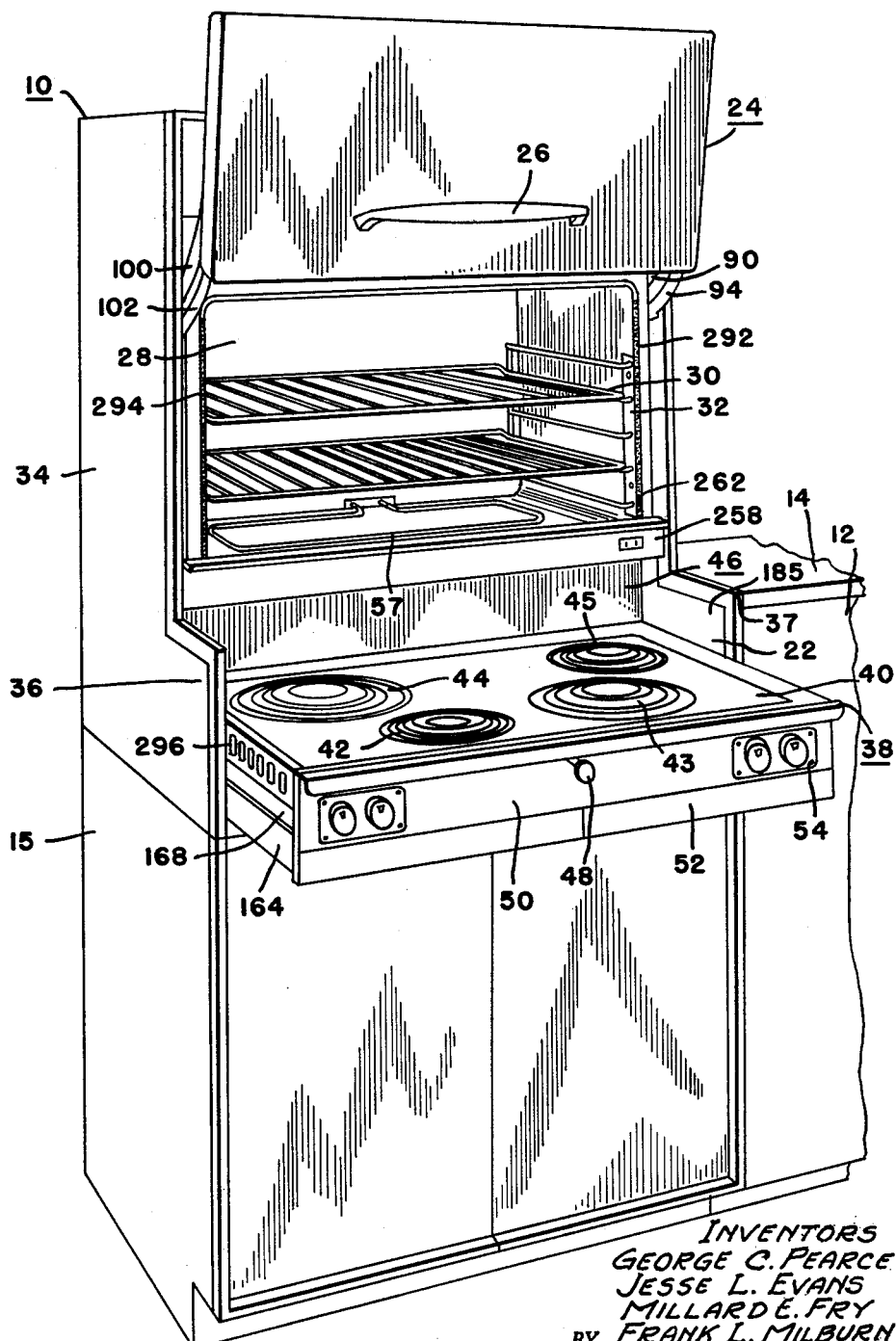
FIGURE 2 is a perspective view of the built-in range of this invention with the burner drawer in its fully out position.
Figure 4:
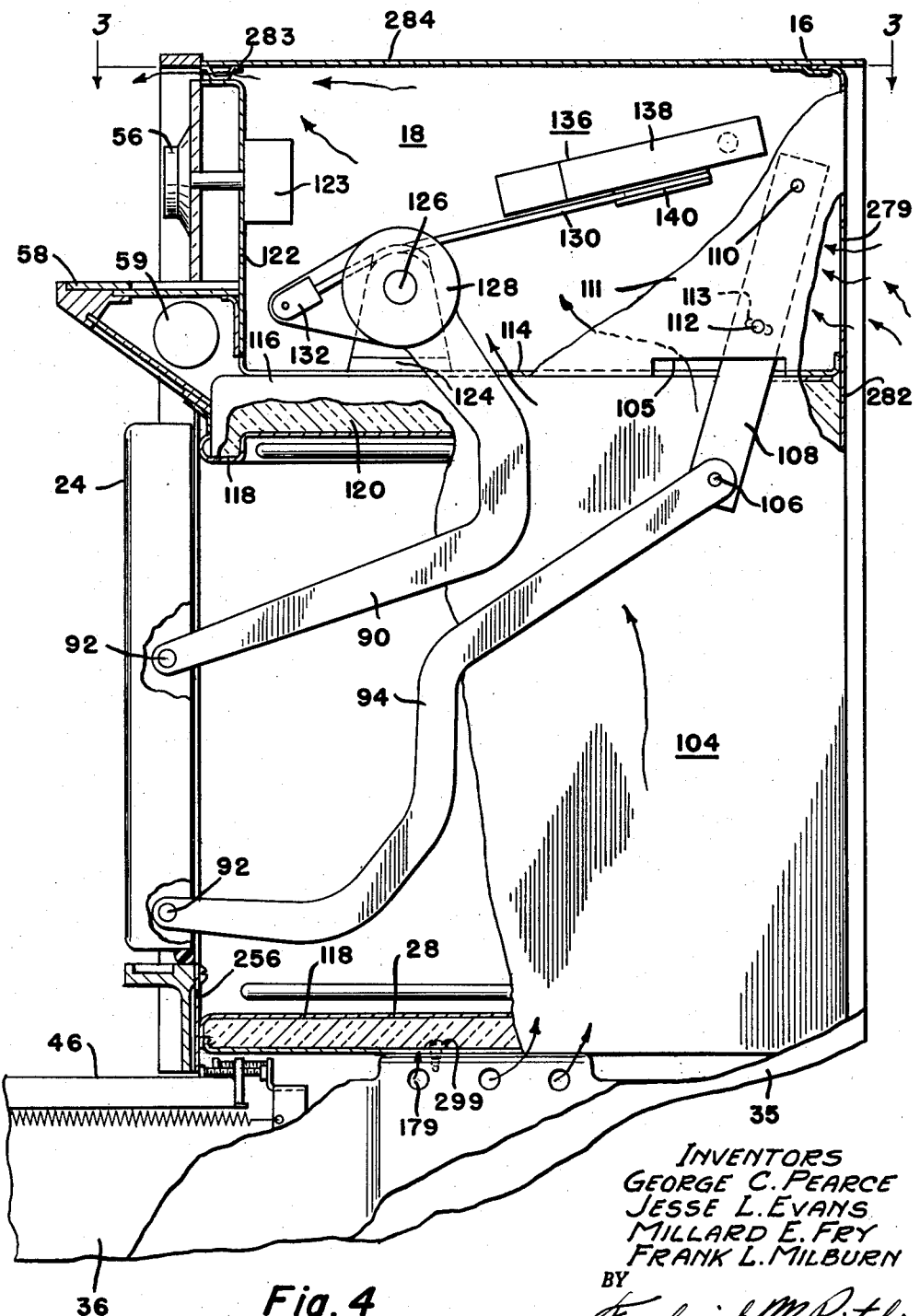
FIGURE 4 is a fragmentary sectional view with parts broken away taken generally along the line 4—4 in FIGURE 3 with the oven door in closed position.

The counterbalancing arrangement and support for the oven door 24 will now be more fully explained. With reference to FIGURE 2, the door 24 is shown supported on its right side by an upper control arm 90 and a lower control arm 94. Similarly, on the left-hand side of the door, an upper control arm 100 is pivotally supported at its outer end to the door 24 while a lower control arm 102 is likewise pivotally connected to the oven door. With reference to FIGURE 4, the casing 16 is shown with a portion of its sidewall 35 broken away to expose an insulation retainer 104 adjacent which the lower control arm 94 is pivotally attached to a pin 106 on a control arm adjusting bracket or metal strip 108 which extends from the control compartment through a slot 105 in a partition 114 into the space between the insulation retainer 104 and the casing side wall 35. Within the control compartment the adjusting strip 108 is pivotally fastened at 110 to a control housing sidewall 111 (107 on the left side of the range) upstanding from and integral with the partition 114 which separates the control and oven compartments. Lower control arm adjustment is made possible by a set screw 112 in the sidewall 111, 107 operating in a slot 113 in the adjusting strip. This permits the inner door panel of the door 24 to be positioned in a coplanar relationship with the front of the oven in order to effect proper sealing of the oven liner 28. The insulation retainer 104 extends horizontally inwardly beneath the control compartment to define a retainer wall portion 116 spaced from the oven forming liner 118, thereby to retain therebetween any conventional insulation, such as 120. The partition 114 forms the bottom wall of a generally open top box-like structure which defines in part the controls compartment. An integral turned up flange portion 122 at the front of the partition 114 supports the range control, such as 123. Affixed to the partition 114 and upstanding therefrom is a right-hand upper control arm pivot support bracket 124 which includes a transverse shaft 126 for rotatably mounting a cable support portion or changing moment arm extension or crank arm portion 128 on the end of the control arm 90. A right-hand cable or flexible bond 130 is connected by a U-shaped anchor bracket 132 to the outer extremity of the changing moment arm extension 128. In similar fashion the left-hand side of the oven door 24 is supported and counterbalanced by a left-hand control arm support bracket 125 for journalling the opposite end of shaft 126. A moment arm extension 129 on the control arm 100 grips a second cable 131 extending toward the counter-balance mechanism. Thus, as the door 24 is moved vertically upwardly to its open position seen in solid lines in FIGURE 5, the distance between the pivot shaft 126 and the flexible bonds 130, 131 is continuously changed. This changing moment arm in conjunction with a pivotable spring support assembly 136 effects the counterbalancing arrangement of this invention as will be more fully described next following.

The spring support assembly 136 includes a laterally elongated U-shaped support member 136 having a right-hand flexible bond support pulley 140 and a left-hand flexible bond support pulley 142. A pair of springs are carried by the support member 138 and includes a right-hand door support spring 144 and a left-hand door support spring 146. The springs are affixed at one end to the flexible door support bond and the other end to the support member 138. The spring support member 138 is pivotally mounted at 148 and 149 to brackets 150, 152 affixed to the upstanding sidewalls 111, 107, respectively, of the control housing partition 114. Note that the spring support member 138, during counterbalancing, pivots to maintain the pulleys 140 and 142 coplanar with the cables or flexible bonds 130, 131. It is within the purview of this invention to utilize compression springs instead of the tensioning springs 144 and 146. It has been found that compression springs, in which the control arm cables extend through the center of the spring for attachment at the opposite end thereof, facilitate a more compact counterbalancing arrangement. In other words the width of the support member 138 can be reduced to make the counterbalancing arrangement more adaptable to a smaller oven door such as is used in our aforementioned copending application S.N. 19,082. Thus it is within the contemplation of this invention to use a counterbalancing support spring assembly which will use a pair of compression springs suitably guided in sleeves to prevent lateral deflection of the compressing springs as the oven door is closed.

An automatic oven light is also operated by the control arm shaft 126. A terminal block 155 is mounted on the control housing partition 114 and extends into the oven liner to receive a light bulb (not shown). In conjunction therewith an oven light switch 157 includes an actuator button 159 which is engaged by a tap 153 secured to the shaft 126 and pivoted thereby to energize the light whenever the oven door 24 is opened.

The construction of the slidably removable burner drawer will now be more fully explained in connection with FIGURES 2, 6, 7, 16, 17 and 20. With reference to FIGURE 17, the burner drawer 38 is shown with its recessed top surface 40 including a plurality of openings 160 and 162 for receiving the surface cooking units 43 and 42, respectively. The burner drawer 38 has vertical sidewalls 163 and 164 which include inwardly formed channels 166 and 168 to receive rollers 170 and 172 rotatably fixed as by brackets 174 and 176 to the outside of a U-shaped reinforcement pan shown generally at 180. The reinforcement pan 180 is formed like a large sheet metal basin or channel having an integral bottom wall 182 interconnecting the upstanding sides of the reinforcement pan. Suitable ribbing 181, 183 is utilized to strengthen the pan as the main structural member for supporting the burner drawer 38 and the cheek plate extensions 36, 37 of the casing 116. As a cost savings gesture a stainless steel plate 185 is welded to each of the reinforcement pan side walls in the inside area of the cheek plate exposed when the drawer 38 is in one of its open positions. In this manner the pan 180 may be made of rugged but less decorative sheet metal.

The burner drawer 38 includes a bottom wall 184 for catching the drippings through the cooking unit openings 160 and 162. A reinforcement panel 186 is welded to the underside of the bottom wall 184 for strengthening purposes. It is in this area about the bottom wall 184 that the slidably removable drip trays 52 may be adapted to reside. The guide rail 190 is also formed with a rear burner energized cam flange 191 and a rear burner deenergized cam flange 193. The left-hand guide rail 192 is formed to selectively energize the front cooking units or burners 42, 43 and includes a front burner energized cam flange 195 and a front burner deenergized cam flange 197. In brief, a front burner interlock switch 272 includes an actuator 273 (FIG. 17) which follows the front burner cam tracks 195 and 197 while the actuator 265 for the rear burner interlock switch 264 follows the cam tracks 191, 193 on the right-hand guide rail 190.

For supporting the drawer-cover interconnecting mechanism and guiding the cooking unit interlock switches 264, 272 the reinforcement pan 180 has affixed thereto a right-hand guide rail 190 and a left-hand guide rail 192. Each guide rail 190, 192 is formed with a horizontal cover guide flange 194 for guiding the cover 46 in its slidable front to back movement. Each guide 190, 192 serves also to journal a front sprocket support rod or shaft 196 and a rear sprocket support rod 198 in bearings 199 of nylon or other suitable material.

The burner drawer latch which was explained in general in connection with FIGURES 1 and 2 is shown more specifically in FIGURES 6 and 7. A bellcrank 200 is shown pivotally connected to the drawer 38 in any suitable fashion as on an upstanding bracket at 202. The bottom wall 182 of the reinforcing support pan 180 is formed with latch keeper openings 204, 206 and 210. When the actuator knob 48 is pushed, a latch connecting rod 205 pivots a detent portion 208 of the bellcrank out of engagement with the keeper openings 204, 206 and 210 to permit the burner drawer 38 to be slidably moved. When the detent 208 is in keeper opening 204, the drawer 38 is locked in its stored position (FIGURE 6) with the cover 46 concealing all of the deenergized burners 42, 43, 44 and 45 thereon. When the drawer is moved so that the detent 208 is in the keeper opening 206, the burner drawer 38 is in its fully out position (FIGURE 7) and all of the burners 42, 43, 44 and 45 are exposed and energized. The burner drawer may be moved to its half out position (FIGURE 16) wherein the front burners 42, 43 only are exposed and energized. In this half-out relationship the drawer 38 is positively located by the detent 208 in the middle keeper opening 210. This latch arrangement is particularly effective as a safety device to prevent inadvertently moving the burner drawer while a cooking operation is in process and as a safety device for children. Although the latch knob 48 has been placed on the front panel of the drawer in this disclosure, it is believed within the skill of the art to locate the latch actuating knob on a door seal mullion 258 out of the reach of small children.

In FIGURE 6 the burner drawer 38 is shown in its stored position with the cover 46 concealing the cooking units or burners 42, 43, 44 and 45. Note that front sprockets 212, 213 are carried by and affixed to the shaft 196 whereas the pair of rear sprockets such as 214 are carried on and affixed to the rear shaft 198. A right-hand roller or bicycle chain or flexible bond 216 is positioned on the sprockets 212 and 214 for effecting the simultaneously oppositely directed action of the drawer 38 with the cover 46. A left-hand roller chain or flexible bond 217 is similarly engaged with the sprocket 213 and a rear sprocket (not shown) which is coplanar with the sprocket 213 and carried on the shaft 198. The top surface 40 of the drawer 38 has affixed thereto L-shaped brackets 218, 219 at each rear corner thereof adjacent the roller chain 216, 217 respectively. The upstanding legs of the brackets 218, 219 are connected in any suitable fashion to the sides of the roller chains 216, 217, respectively, for movement therewith. Thus, whenever the drawer 38 is withdrawn, it should be seen that the roller chain 216, for instance, will be motivated such that the bottom of the chain moves in one direction while the top of the chain moves in the opposite direction. Since the cover 46 is interconnected with the top of the roller chains 216, 217, movement of the burner drawer will produce an opposite movement at the cover.

Figure 18:
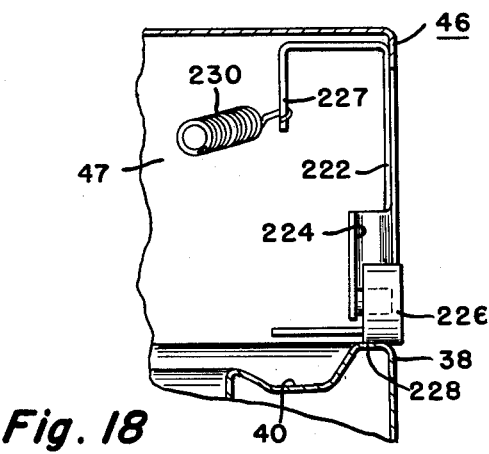
FIGURE 18 is a fragmentary sectional view taken along line 18—18 in FIGURE 6.

One of the important features of this invention is the provision of two operating positions and a stored position for the burner drawer 38 while the cover 46 has a burner concealing position and a single rearwardly open backsplash position. To effect three positions for the burner drawer and but two positions for the cover interconnected therewith a novel lost motion connection is incorporated in the drawer-cover mechanism. Even though the burner drawer 38 has a half-out position wherein two of the burners 42, 43 are exposed and a fully out position wherein all of the burners 42, 43, 44 and 45 are exposed, it is desirable, nevertheless, that the cover 46 move to its rearward backsplash position beneath the oven wherever the burner drawer 38 is moved to either of its exposed positions. To accomplish this action a cover support bracket 222 (FIGURE 18) is fastened in the left front corner of the cover 46 and includes a rearwardly directed extension 224 for rotatably supporting a cover support roller 226 at the left side of the cover—the roller gliding or rolling along the raised side edge 228 of the recessed top surface 40 on the burner drawer. A mirrored replica 223 (FIG. 6) of bracket 222 is placed in the opposite or right hand corner of the cover 46 to support the cover with another roller 226' on a rear bracket extension 224', the roller rolling along the raised right edge 229 of the burner drawer. Connected to a depending flange 227 of the bracket 222 is a left side lost motion spring 230 which is connected at its rearward end to a left-hand cover manipulating bracket portion 232 (FIGURE 17). The braket portion 232 is connected to the top side of the roller chain 217 and depends from a transverse cover pusher flange 236 which serves to push the cover 46 forwardly when the burner drawer 38 is pushed inwardly. At the opposite end of the transverse bar 234 a depending bracket portion 233 is affixed to the top of the roller chain 216, thereby interconnecting both sides of the cover with both sides of the burner drawer through the medium of the roller chains 216 and 217. A right side lost motion spring 231 completes the connection between the cover manipulating bracket portion 233 and the depending flange 227' of the right-hand cover support bracket 223 which is disposed in the right-hand front corner of the cover 46. In this way, the cover 46 has merely the two positions shown in FIGURES 6 (closed or burners covered position) and 7 (backsplash position) whereas the burner drawer 38 has the three positions shown in FIGURE 6 (stored), FIGURE 16 (half out) and FIGURE 7 (fully out). The lost motion springs 230, 231 facilitate this by effecting a lost motion connection between the cover 46 and the cover manipulating brackets 232, 233, respectively. Note in the closed position of FIGURE 6 and the half out position of FIGURE 16 the cover pusher flange 236 is linked directly to the rear of the cover 46. Note also that the guide rails 190 and 192 have downturned cover stop flanges 280, 281 at the front thereof as the cover 46 moves inwardly its front wall 45 abuts the stop flanges 280, 281 to position or immobilize the cover in its backsplash position. But as the drawer 38 is withdrawn further to its full out position of FIGURE 7, the roller chains 216, 217 are rotated also and the springs 230, 231 stretch to compensate for the immobilized cover 46.

Cover adjustment, both moving and stationary, is another feature of this invention. It is desirable to have the front wall 45 of the cover 46 remain generally parallel with the front of the oven as it is moved to its closed position and to align with the front of the burner drawer 38 when in its closed position. For this reason an adjustment means 238 is provided on each side of the cover 46 and will be explained more fully in connection with the right-hand assembly of FIGURE 19. The rearward end of the cover 46 has a downturned flange 240 to which an adjusting screw plate 242 is attached as by welding. Threadedly engaged in the plate 242 is an adjustable pusher screw 244 with an elastomeric head or bumper 246 which is biased by the pusher flange 236 of the actuator bar 234 when the cover 46 is being pushed to its closed position. The adjusting screw 244 has a adjuster head 248 on the front side of the plate 242. By threadedly manipulating the head 248 the distance between the plate 242 and the pushing flange 236 may be varied so that the cover 46 is always pushed forwardly in parallel relationship to the front of the burner drawer 38 and the oven. Aside from the aesthetic value of such parallel motion it also prevents the cover from binding on the range casing cheekplates.

As the cover 46 moves forwardly, it must align with the front of the burner drawer 38. Thus, a cover front stop adjusting screw 252 is threadedly engaged in the plate 242 and includes a head 254 which may be manipulated to adjust the distance between the plate 242 and the front wall 256 of the oven 28. A resilient block 258 is interposed between the oven wall and the stop screw head 254 as a sound deadening device. In order to conceal the heads 254 and 248 a door seal mullion and condensation trough casting 258 is attached to the front wall 256 of the oven as by a screw 260 to which access may be gained through the opening 262 to the oven. The trough acts to catch any condensation or drippings which fall from the door as the result of vapor producing cooking operations on the surface cooking units.

As aforesaid, when the burner drawer 38 is in its half out position, only the front burners are energized. This is accomplished by means of a switch 272 carried on the top surface of the burner drawer having an actuating arm or follower 266 which rides on the bottom of the guide rail 192 (FIGURE 17). While the drawer 38 is moving from its stored to its half out position, the switch actuator 266 moves from the cam track 197 to the cam track 195, thereby to energize the front burners 42, 43. A similar switch 264 is included on the other side of the burner drawer for energizing the rear burners 44, 45 when the drawer is moved to its fully out position. For instance, the switch 264 includes a follower or actuator 265 which holds the rear burners deenergized as it moves along the came track 193 but which energizes the rear burners as the follower 265 moves to the cam track 191.

In order to insure that the cover 46 has a smooth horizontal motion, the actuator bar 232 includes S-shaped brackets 284, 285 at each end thereof to act as stabilizers or outriggers. Each has a plastic end piece 286 of nylon or other suitable material for gliding on the top flange 194 of the guide rails 190 and 192. An angle iron extension 287, 288 extends rearwardly from the back of the cover 46, and glides in an upturned retainer portion 289 of the plastic guide during the time that the cover is stopped or immobilized and the burner drawer is moving from its half out to its full out position, i.e. the lost motion connection.

Figure 12:
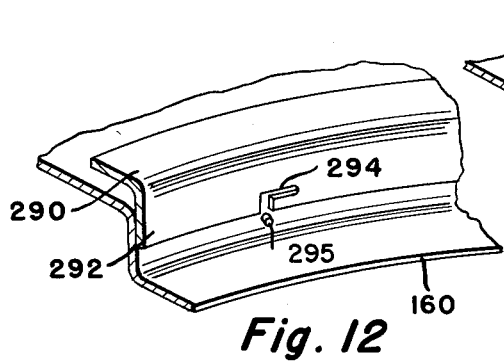
FIGURE 12 is a fragmentary perspective view of a trim ring suitable for use with this invention.
Figure 13:
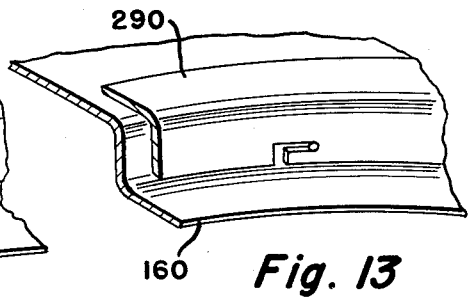
FIGURE 13 is a fragmentary perspective view of the trim ring in its locked position.
Figure 14:
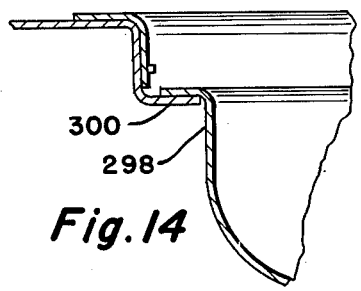
FIGURE 14 is a fragmentary sectional view of the trim ring and drip bowl.

The design of the top surface 40 of the burner drawer 38 includes annular embossments or ribs such as 291 (FIG. 17) to cooperate with the raised side edges 228 and 229 in retaining spillages on the top surface. Where the top is decorative, such as stainless steel, this construction eliminates the need for trim rings. But where the annular ribs 291 are not formed on the burner drawer, a trim ring embodiment suitable for use with this invention is seen in FIGURES 12, 13 and 14. A trim ring 290 includes a downturned flange 292 having a slot 294 for receiving a protuberance 295 on a downturned wall circumscribing the burner opening 160. The trim ring 290 is merely pushed downwardly on the protuberance 295 and rotated slightly to lock the trim ring to the top surface of the burner drawer. It should be seen that the cooking units themselves need not be manipulated to remove a trim ring of this type. In a conventional manner a drip bowl 298 may be disposed on a shoulder 300 to catch any drippings from the cooking operations.

Figure 3:
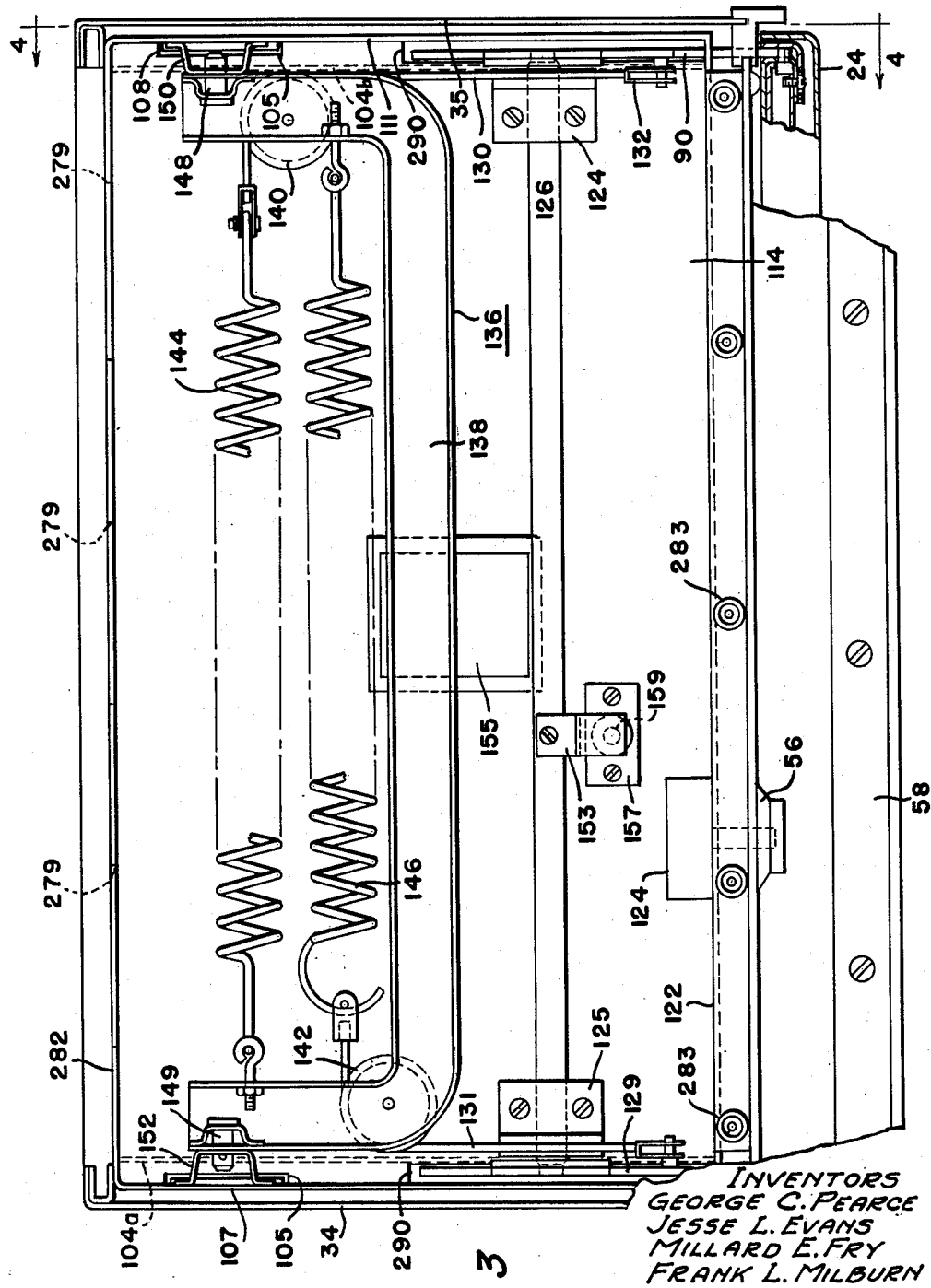
FIGURE 3 is a sectional view taken along line 3—3 in FIGURE 4.
Figure 5:
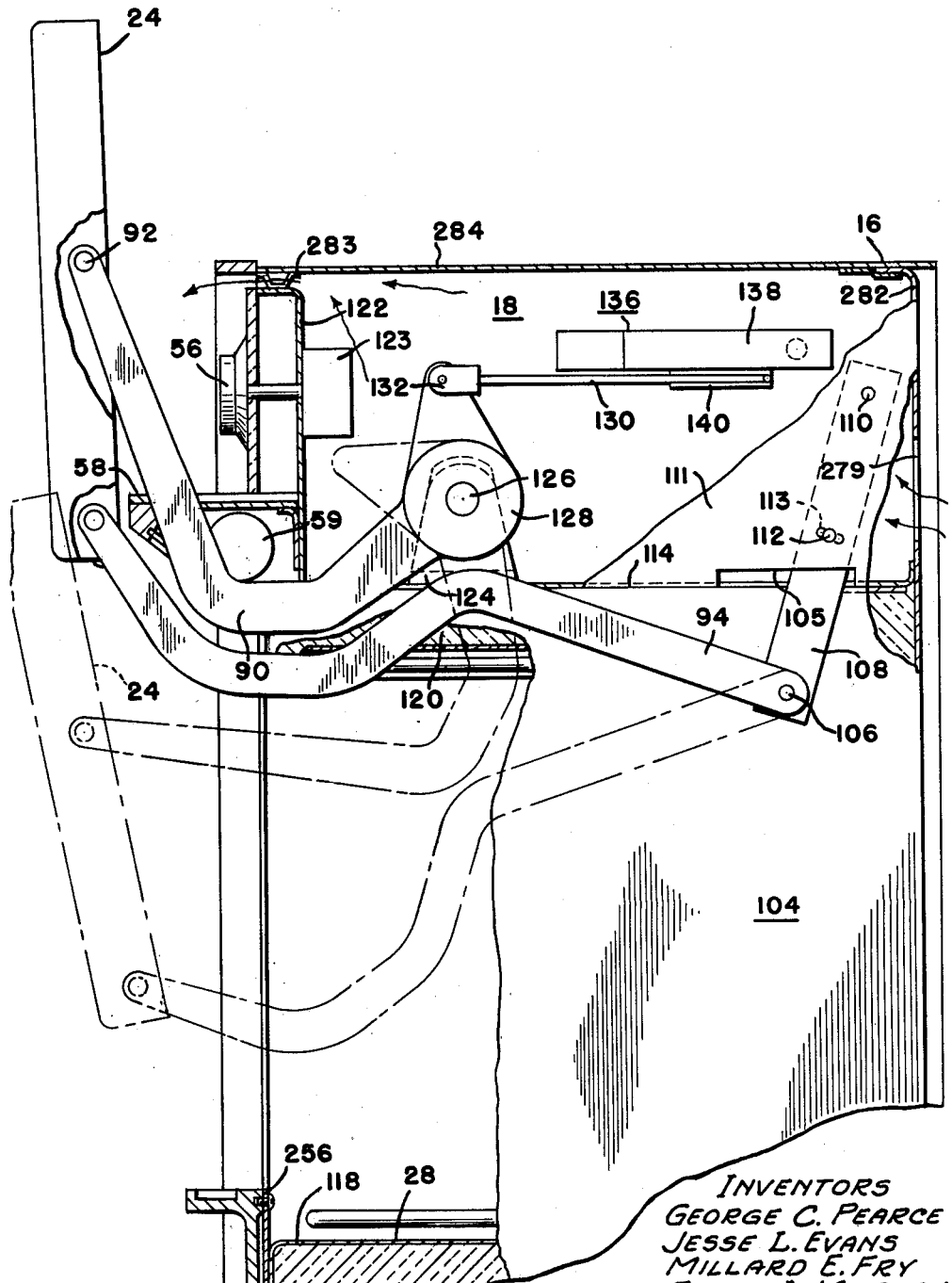
FIGURE 5 is a fragmentary sectional view with parts broken away taken along the line 4—4 in FIGURE 3 with the oven door in open and broil position.

Ventilation for the range 10 is divided into three parts, the control compartment, the oven and the burner drawer compartment. In the control compartment 18 (FIGURES 3, 4 and 5) openings 279 are formed in a casing rear wall or rear insulation retainer panel 282. At the front of the controls compartment a removable casing top panel 284 is spaced from the upstanding flange 122 by a plurality of cup-like spacers 283. Ventilation, as shown by air flow arrows in FIGURES 4 and 5, is effective to maintain the control compartment at suitable temperatures. Note also that air spaces or vent passages are formed between the casing sides 34, 35 and the insulation retainer sidewalls 104a, 104b, respectively which extend from the inwardly turned top flanges of the pan 180 at the bottom of the range to the control compartment 18, and which are connected to the control housing by way of the control arm slots 105 and 290 at each side of the control compartment. Draft inducing vent openings 179 interconnect the burner compartment 22 with these air spaces and this upsweep of cooling air along the sides of the oven liner maintains the exterior of the range suitable cool.

The venting of oven is accomplished at the front thereof by the door mounted bottom silicone seal 80 in conjunction with the oven liner side mounted silicone seals 292, 294 (FIGURE 2). The space between the top of the oven door and the top of the oven opening defines an air passage for venting the oven during baking operations.

Lastly, the burner drawer 38 is ventilated by side vents 296 (FIGURES 1 and 2) which communicate with the burner compartment 22 and from there to the air spaces extending vertically between the casing sidewalls and the insulation retainer. Outside air will enter the burner compartment wherever a gap exists between the drawer 38 and its support means such as the reinforcement pan portion 180 of the outer casing means (see air flow arrows in FIGURES 6 and 17).

It should now be seen that an improved integral built-in range has been provided which includes both baking facilities and surface cooking facilities. The novel slidable drawer with oppositely movable cover is believed to enhance the built-in appearance such that a clean unbroken line is established with the base cabinets in which the range is installed. A space saving lift-type door of novel construction is provided with an unlatching device which allows the door to be flipped over for easy cleaning. Stepped energization of the surface cooking units is also afforded by the teachings of this invention and a safety latch is effective to prevent the burner drawer from being moved accidentally.

The foregoing construction is believed to set forth a new concept in modular range design. The oven liner compartment 28 is fastened to the burner drawer compartment solely by screws 299 extending from the bottom wall of the insulation retainer 104 into the inwardly turned top flanges of the reinforcement pan 180. The control compartment 18 mounts to the top of the oven liner compartment and extends sidewardly over the top edge of the insulation retainer to receive the oven door support arms. Thus a complete range is assembled simply by attaching the casing side panels 34 and 35 to the stacked assembly of burner drawer, oven and control compartment. By separating the oven and control compartment from the burner drawer as by screws 299 and eliminating the side panels 34 and 35, the subcombinations then become, with minor decorative panel adaptations, a complete wall oven and a complete cooking top suitable for separate built-in installation.

While the embodiments of the present invention as herein disclosed, constitute preferred forms, it is to be understood that other forms might be adopted.

What is claimed is as follows:

1. In combination, a range adapted for installation in a countertop and comprising, a casing defining a surface cooking unit compartment, a surface cooking unit, a surface cooking unit drawer member for supporting said surface cooking unit and slidably movable from a position within said surface cooking unit compartment to a position outside of said surface cooking unit compartment, said cooking unit compartment enclosing a rotatably mounted pair of spaced sprockets and a chain circumscribing said sprockets, said drawer member connected to said chain on one side of said sprockets, a cover member connected to said chain on the other side of said sprockets for oppositely directed slidable movement with said drawer member, resilient means in the connection of said chain with one of said members, said cover having front and top walls for concealing said surface cooking unit when said drawer is in said position within said cooking unit compartment, and said cover exposing said surface cooking unit when said drawer is in said position outside of said surface cooking unit compartment, whereby said front wall forms a back splash for said surface cooking unit.

2. A cooking range comprising, a casing defining a surface cooking unit compartment, a surface cooking unit, a burner drawer member for supporting said surface cooking unit and slidably movable from a position within said surface cooking unit compartment to a position outside of said surface cooking unit compartment, said cooking unit compartment enclosing a rotatable means and a flexible bond wrapped around said rotatable means, said drawer member connected to said bond on one side of said rotatable means, a cover member connected to said bond on the other side of said rotatable means for effecting oppositely directed slidable movement to said drawer member, resilient means in the connection of said flexible bond with one of said members to permit movement of said drawer member when said cover member is stationary, said cover member having a wall for concealing said surface cooking unit when said drawer member is in said position within said cooking unit compartment, and said cover member exposing said surface cooking unit when said drawer member is in said position outside of said surface cooking unit compartment, whereby said wall forms a back splash for said surface cooking unit.

3. The combination of claim 2 wherein said cooking unit is selectively energizeable in response to the movement of said burner drawer member.

4. A cooking range comprising, a casing having a fixed panel and defining a surface cooking unit compartment, a surface cooking unit, a burner drawer member for supporting said surface cooking unit and slidably movable from a position within said surface cooking unit compartment to a position outside of said surface cooking unit compartment, said cooking unit compartment enclosing a rotatable means and a flexible bond wrapped around said rotatable means, said drawer member connected to said bond on one side of said rotatable means, a cover member connected to said bond on the other side of said rotatable means for effecting oppositely directed slidable movement to said drawer member, resilient means in the connection of said flexible bond with one of said members to permit movement of said drawer member when said cover member is stationary, said cover member having a wall for concealing said surface cooking unit when said drawer member is in said position within said cooking unit compartment, said cover member exposing said surface cooking unit when said drawer member is in said position outside of said surface cooking unit compartment, whereby said wall forms a back splash for said surface cooking unit, and means for adjusting the position of said cover member relative to said fixed panel.

5. A cooking range comprising, a casing defining a surface cooking unit compartment, a surface cooking unit, a burner drawer member for supporting said surface cooking unit and slidably movable from a position within said surface cooking unit compartment to a position outside said surface cooking unit compartment, said cooking unit compartment enclosing a rotatable means and a flexible bond circumscribing said rotatable means, said drawer member connected to said flexible bond on one side of said rotatable means, a cover member for concealing said cooking unit, means for connecting said cover member to said flexible bond on the other side of said rotatable means for effecting oppositely directed slidable movement of said cover member to said drawer member, said cover member connecting means including adjustable pusher means for unyieldingly pushing said cover member in one direction and resilient pulling means for yieldingly pulling said cover member in another direction.

6. A cooking top comprising, a cooking unit, means for rollingly supporting said cooking unit between horizontally displaced stored and operable positions, relatively fixed chain and sprocket means connected to said supporting means, and cover means oppositely horizontally movably interconnected with said supporting means through said chain and sprocket means for selectively covering and uncovering said cooking unit solely in response to the movement of said supporting means, said cover means being withdrawable into said casing means when said cooking unit is in said operable position.

7. In combination with a countertop having a top surface and a front wall, a cooking top adapted for installation in said countertop, a cooking unit, a support member for said cooking unit below said top surface and having a front panel, means for slidably supporting said support member between a first position wherein said front panel is substantially coplanar with said front wall and a second position wherein said front panel is in front of said front wall, a cover member for said support member having a top portion coplanar with said top surface and a front portion, means for slidably supporting said cover member between a first position wherein said front portion is substantially coplanar with said front panel and said front wall and a second position wherein said front portion is behind said cooking unit, and means for interconnecting said members for simultaneous oppositely directed movement of said members to their second positions.

8. In combination with a countertop having a top surface and a front wall, a cooking top adapted for installation in said countertop, at least two cooking units, a support member for said cooking units below said top surface and having a front panel, means for slidably supporting said support member between a first stored position wherein said front panel is substantially coplanar with said front wall, a third fully out position wherein said front panel is in front of said front wall and a second half out position intermediate said first and third positions, a cover member for said support member having a top portion coplanar with said top surface and a front portion, means for slidably supporting said cover member between a first cover position wherein said front portion is substantially coplanar with said front panel and said front wall and a second backsplash position wherein said front portion is behind at least one of said cooking units, and means for interconnecting said members for simultaneous oppositely directed movement of said members to their second positions, said last named means including yielding means for permitting said support member to move to said third position while said cover member remains in said second backsplash position.

9. A cooking top comprising, at least two cooking units, a support member for said cooking units and having a front panel, means for slidably supporting said support member between a first stored position, a third fully out position and a second half out position intermediate said first and third positions, a cover member for said support member having a front portion, means for slidably supporting said cover member between a first cover position wherein said front portion is coplanar with said front panel and a second backsplash position wherein said front portion is behind at least one of said cooking units, and means for interconnecting said members for simultaneous oppositely directed movement of said members to their second positions, said last named means including yielding means for permitting said support member to move to said third fully out position while said cover member remains in said second backsplash position.

10. In combination, a range comprising, casing means defining an upper control compartment, an intermediate oven compartment and a lower surface cooking unit compartment, said control compartment having a control panel spaced along its upper edge from said casing means to form an exhaust outlet from said control compartment, an oven liner in said oven compartment having a front opening below said control panel and spaced from said casing means along one side thereof to form a vent passage between said cooking unit compartment and said control compartment, a door for closing said opening, means pivotally connected at one end thereof to said casing means in said control compartment and extending through said vent passage to a pivotal connection with said door at the other end thereof for supporting said door between a first vertically disposed position adjacent said front opening and a second generally vertically disposed position above said first position and spaced in front of said control panel, a surface cooking unit, means for heating in said oven liner, means on said control panel for controlling said heating means, drawer means for supporting said surface cooking unit and slidably movable from a position within said cooking unit compartment to a position outside of said cooking unit compartment, and a cover interconnected with said drawer for oppositely directed glideable movement, said cover having front and top walls for concealing said surface cooking unit when said drawer is in said position within said cooking unit compartment whereby residual heat from said cooking unit gravitationally exhausts from said cooking unit compartment through said vent passage and said control compartment to said exhaust outlet.

11. The combination of claim 10 including means projecting outwardly from said control panel below said controlling means and above said front opening of said oven liner for deflecting heat from said controlling means, the projection of said deflecting means terminating closely adjacent the rear of said oven door when said door is in said second position.

12. The combination of claim 11 wherein said deflecting means is a lamp housing for illuminating the front opening of said oven liner.

13. In combination, a range comprising, casing means defining an upper control compartment, an intermediate oven compartment and a lower surface cooking unit compartment, said control compartment having a control panel spaced along one edge from said casing means to form an exhaust outlet from said control compartment, oven liner means in said oven compartment having an opening and spaced from said casing means along one side thereof to form a vent passage between said cooking unit compartment and said control compartment, a door for closing said opening, means interconnecting said door and said casing means and extending through said vent passage for supporting said door between open and closed positions, means for heating in said oven liner means, a surface cooking unit, means on said control panel remote from said exhaust outlet for controlling said heating means, drawer means for supporting said surface cooking unit and slidably movable from a position within said cooking unit compartment to a position outside of said cooking unit compartment, means including said drawer means defining an outside air inlet interconnecting said cooking unit compartment with the atmosphere below said vent passage, and a cover interconnected with said drawer means for oppositely directed glideable movement, said cover having wall means for concealing said surface cooking unit when said drawer means is in said position within said cooking unit compartment whereby an upsweep of air from said outside air inlet through said cooking unit compartment, said vent passage, said control compartment and said exhaust outlet carries away residual heat from said cooking unit and prevents portions of said casing means adjacent said oven liner means from overheating.

14. In combination, a range comprising, casing means defining an upper control compartment, an intermediate oven compartment and a lower compartment, said control compartment having a control panel spaced along one edge from said casing means to form an exhaust outlet from said control compartment, oven liner means in said oven compartment having an opening and spaced from said casing means along one side thereof to form a vent passage between said lower compartment and said control compartment, a door for closing said opening, means interconnecting said door and said casing means and extending through said vent passage for supporting said door between open and closed positions, means for heating in said oven liner means, means on said control panel remote from said exhaust outlet for controlling said heating means, drawer means slidably movable from a position within said lower compartment to a position outside of said lower compartment, and means including said drawer means defining an outside air inlet interconnecting said lower compartment with the atmosphere below said vent passage whereby an upsweep of air from said outside air inlet through said lower compartment, said vent passage, said control compartment and said exhaust outlet prevents portions of said casing means adjacent said oven liner means from overheating.

15. In combination, casing means defining a cooking top, a cooking unit, means for supporting said cooking unit between a stored position inside said casing means and an operable position outside said casing means, cover means movable between a cooking unit covered position outside of said casing means when said cooking unit is in said stored position and a cooking unit uncovered postion inside said casing means when said cooking unit is in said operable position, and means interconnecting said cover means and said supporting means in a manner whereby the movement of said supporting means from said stored position to said operable position automatically effects the movement of said cover means from said cooking unit covered position to said cooking unit uncovered position.

16. In combination, casing means defining a cooking top, a cooking unit, means for supporting said cooking unit in a first plane between a stored position inside said casing means and an operable position outside said casing means, cover means movable in a second plane parallel to said first plane between a cooking unit covered position outside of said casing means when said cooking unit is in said stored position and a cooking unit uncovered position inside said casing means when said cooking unit is in said operable position, and means interconnecting said cover means and said supporting means in a manner whereby the movement of said supporting means in said first plane in one direction from said stored position to said operable position automatically effects the movement of said cover means in said second plane in the opposite direction from said cooking unit covered position to said cooking unit uncovered position.

17. In combination, a range comprising, casing means defining an upper control compartment extending substantially completely across the top of said range, an intermediate oven compartment and a lower compartment, said control compartment having a control panel, means interposed between said casing means and said control panel along an upper edge thereof to space said casing means from said control panel and defining an exhaust outlet from said control compartment extending substantially completely across the top of said range, oven liner means in said oven compartment having an opening and spaced from said casing means along one side thereof to form a vent passage between said lower compartment and said control compartment, a door for closing said opening, control arm means interconnecting said door and said casing means and extending through said vent passage for supporting said door between open and closed positions, means for heating in said oven liner means, means on said control panel below said exhaust outlet for controlling said heating means, drawer means slidably movable from a position at least partially within said lower compartment to a position at least partially outside of said lower compartment, and means including said drawer means defining an outside air inlet interconnecting said lower compartment with the atmosphere below said vent passage whereby an upsweep of air from said outside air inlet through said lower compartment, said vent passage, said control compartment and said exhaust outlet prevents portions of said casing means adjacent said oven liner means from overheating.

18. In combination, a range comprising, casing means defining an upper control compartment, an intermediate oven compartment and a lower surface cooking unit compartment, said control compartment having a control panel and means spacing said control panel along its upper edge from said casing means to form an exhaust outlet from said control compartment, an oven liner in said oven compartment having a front opening below said control panel and spaced from said casing means along one side thereof to form a vent passage between said cooking unit compartment and said control compartment, a door for closing said opening, means pivotally connected at one end thereof to said casing means in said control compartment and extending through said vent passage to a pivotal connection with said door at the other end thereof for supporting said door between a first vertically disposed position adjacent said front opening and a second generally vertically disposed position above said first position and spaced in front of said control panel and said exhaust outlet, a surface cooking unit, means for heating in said oven liner, means on said control panel for controlling said heating means, and drawer means for supporting said surface cooking unit and slidably movable from a position at least partially within said cooking unit compartment to a position at least partially outside of said cooking unit compartment, whereby residual heat from said cooking unit gravitationally exhausting from said cooking unit compartment through said vent passage and said control compartment to said exhaust outlet is deflected by said door in said second position.

References Cited in the file of this patent

UNITED STATES PATENTS

| | | |
|---|---|---|
| 1,244,407 | Avedisian et al. | Oct. 23, 1917 |
| 1,962,819 | Hoffstetter et al. | June 12, 1934 |
| 1,989,749 | Fullerton | Feb. 5, 1935 |
| 2,159,221 | Mills | May 23, 1939 |
| 2,492,084 | Almquist | Dec. 20, 1949 |
| 2,712,818 | Chambers | July 12, 1955 |
| 2,806,464 | Williams et al. | Sept. 17, 1957 |
| 2,887,103 | Reeves | May 19, 1959 |
| 2,972,036 | Pollock et al. | Feb. 14, 1961 |
| 2,978,567 | Crispell et al. | Apr. 4, 1961 |